United States Patent [19]
Jones et al.

[11] Patent Number: 5,310,857
[45] Date of Patent: May 10, 1994

[54] POLY(ETHYLENE 2,6-NAPHTHALENE DICARBOXYLATE)/AROMATIC KETONE COMPOSITIONS HAVING REDUCED FLUORESCENCE

[75] Inventors: Allan S. Jones, Church Hill; David E. Mills, Kingsport, both of Tenn.; Mitchell A. Winnik, Toronto, Canada

[73] Assignee: Eastman Chemical Company, Kingsport, Tenn.

[21] Appl. No.: 103,645

[22] Filed: Aug. 9, 1993

[51] Int. Cl.$^5$ .............................................. C08G 14/00
[52] U.S. Cl. .................................... 528/220; 528/272; 528/298; 528/302; 528/308; 252/301.35
[58] Field of Search ............... 528/220, 272, 298, 302, 528/308; 252/301.35

[56] References Cited
U.S. PATENT DOCUMENTS 3,994,987 11/1976 Cowell et al. ..................... 524/193
4,012,360 3/1977 Schwarzenbach et al. ...... 156/307.7

OTHER PUBLICATIONS

Chen Shangxian et al., "Fluorescence Spectra of Poly(Ethylene-2,6-Napththalene Dicarboxylate)", *Scientia Sinica*, vol. XXIV, No. 5, May 1981.
CAO Ti et al., "Intermolecular Excimer Interaction in Poly(Polytetramethylene Ether Glycol Aryl Dicarboxylate", *Acta Chimica Sinica*, vol. 42, No. 1, 1984.

Primary Examiner—Samuel A. Acquah
Attorney, Agent, or Firm—John D. Thallemer; William P. Heath, Jr.

[57] ABSTRACT

This invention relates to a poly(ethylene 2,6-naphthalene dicarboxylate) composition having reduced fluorescence. More specifically, the composition contains poly(ethylene 2,6-naphthalene dicarboxylate) with 0.1 to 5 mole percent of a copolymerizable aromatic ketone. The polyesters are useful for packaging applications where clarity and/or aesthetic appeal are of concern.

18 Claims, No Drawings

POLY(ETHYLENE 2,6-NAPHTHALENE DICARBOXYLATE)/AROMATIC KETONE COMPOSITIONS HAVING REDUCED FLUORESCENCE

FIELD OF THE INVENTION

This invention relates to a poly(ethylene 2,6-naphthalene dicarboxylate) composition having reduced fluorescence. More specifically, the composition contains poly(ethylene 2,6-naphthalene dicarboxylate) with 0.1 to 5 mole percent of a copolymerizable aromatic ketone. The polyesters are useful for packaging applications where clarity and/or aesthetic appeal are of concern.

BACKGROUND OF THE INVENTION

Poly(ethylene-2,6-naphthalene dicarboxylate), referred to as PEN, is widely used as an extrusion and injection molding resin because of its good heat resistance, high glass transition temperature, and gas barrier properties. PEN is used in the fabrication of various articles for household or industrial use, including appliance parts, containers, and auto parts. One major drawback of PEN, however, is its inherent bluish fluorescence. Thus, objects prepared with PEN have a hazy and bluish appearance. This phenomenon is especially of concern in the packaging of foods and beverages wherein the food or beverage inside the PEN container appears unnatural.

Fluorescence is a type of luminescence in which an atom or molecule emits radiation in passing from a higher to a lower electronic state. The term is restricted to phenomena in which the time interval between absorption and emission of energy is extremely short ($10^{-10}$ to $10^{-6}$ second). Fluorescence in a polymer or small molecule, occurs when a photon is emitted from an excited singlet state. Quenching of fluorescence eliminates or reduces the ability for photon emission by providing an alternative pathway for the excited state energy such as vibronic or heat loss, or intersystem crossing to the excited triplet state.

Methods to quench fluorescence in PEN have been disclosed by Chen Shangxian et al. in an article entitled, "Fluorescence Spectra Of Poly(Ethylene-2,6-Naphthalene Dicarboxylate)" which appeared in SCIENTIA SINICA, Vol. XXIV, No. 5, May 1981, and by CAO Ti et al. in an article entitled, "Intermolecular Excimer Interaction In Poly(Polytetramethylene Ether Glycol Aryl Dicarboxylate)" which appeared in *ACTA CHIMICA SINICA*, Vol. 42, No. 1, 1984. Both of the references disclose the use of o-chlorophenol to quench PEN fluorescence in a chloroform solution. Dissolving the PEN in a chloroform solution to disperse the fluorescence quencher therein, however, is not practical on an industrial scale because only very dilute PEN solutions can be prepared. In addition, the PEN must have a low molecular weight to dissolve in the chloroform solution.

In contrast, the present inventors have unexpectedly determined that the incorporation of 0.1 to 5 mole percent of a copolymerizable aromatic ketone in PEN significantly reduces fluorescence without deleteriously effecting the physical properties of the polyester. cl

SUMMARY OF THE INVENTION

Accordingly, it is one object of the present invention to provide PEN compositions with reduced fluorescence.

Accordingly, it is another object of the invention to provide PEN compositions which have reduced fluorescence and are useful in applications where good heat resistance, high glass transition temperature and gas barrier properties are required.

These and other objects are accomplished herein by a poly(ethylene 2,6-naphthalene dicarboxylate) composition with reduced fluorescence comprising repeat units from:

(a) a dicarboxylic acid component which comprises at least 85 mole percent of a dicarboxylic acid selected from the group consisting of naphthalene-2,6-dicarboxylic acid, and naphthalene-2,6-dicarboxylate ester;

(b) a diol component which comprises at least 85 mole percent of ethylene glycol; and (c) 0.1 to 5 mole percent, based on 100 mole percent dicarboxylic acid and 100 mole percent diol, of a copolymerizable aromatic ketone which has at least one acyl group directly attached to the aromatic ring.

DESCRIPTION OF THE INVENTION

The polyester of the present invention is poly(ethylene 2,6-naphthalene dicarboxylate) with a fluorescence quenching compound. The poly(ethylene 2,6-naphthalene dicarboxylate) polymer contains repeat units from a dicarboxylic acid, a diol and a copolymerizable aromatic ketone. The dicarboxylic acid, component (a), consists of at least 85 mole percent naphthalene-2,6-dicarboxylic acid or naphthalene-2,6-dicarboxylate ester. The diol, component (b), consists of at least 85 mole percent ethylene glycol. The copolymerizable aromatic ketone, component (c), consists of 0.1 to 5 mole percent, based on 100 mole percent dicarboxylic acid and 100 mole percent diol, of a copolymerizable aromatic ketone diacid, diester or diol. Preferably, the polyester contains repeat units from at least 90 mole percent naphthalene-2,6-dicarboxylic acid or naphthalene-2,6-dicarboxylate ester, and at least 90 mole percent ethylene glycol. More preferably, the polyester contains at least 95 mole percent naphthalene-2,6-dicarboxylic acid or naphthalene-2,6-dicarboxylate ester, and at least 95 mole percent ethylene glycol.

The dicarboxylic acid component of the polyester may optionally be modified with up to 15 mole percent of one or more different dicarboxylic acids other than naphthalene-2,6-dicarboxylic acid or naphthalene-2,6-dicarboxylate ester. Such additional dicarboxylic acids include aromatic dicarboxylic acid preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with naphthalene-2,6-dicarboxylic acid or naphthalene-2,6-dicarboxylate ester are: terephthalic acid, phthalic acid, isophthalic acid, cyclohexanediacetic acid, diphenyl 4,4'-dicarboxylic acid, succinic acid, glutaric acid, adipic acid, fumaric acid, azelaic acid, sebacic acid, 2,7-naphthalene dicarboxylic acid, 1,4-cyclohexanedicarboxylic acid, resorcinoldiacetic acid, diglycolic acid, 4,4'-oxybis(benzoic) acid, biphenyldicarboxylic acid, 1,12-dodecanedicarboxylic acid, 4,4'-sulfonyldibenzoic acid, 4,4'-methylenedibenzoic acid, trans 4,4'-stilbenedicarboxylic acid, and the like. It should be understood that use of the corresponding acid anhydrides, esters, and acid chlorides of these acids is included in the term "dicarboxylic acid". The polyester may be prepared from one or more of the above dicarboxylic acids or esters.

In addition, the polyester may optionally be modified with up to 15 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane 1,3-diol, butane 1,4-diol, pentane 1,5-diol, hexane 1,6-diol, 2,2-dimethyl-1,3-propanediol, 1,10-decanediol, 2,2,4,4-tetramethyl-1,3-cyclobutanediol, 3-methylpentanediol-(2,4), 2-methylpentanediol (1,4), 2,2,4-trimethylpentanediol-(1,3), 2-ethylhexanediol-(1,3), 2,2-diethylpropanediol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The polyester may be prepared from one or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or diols generally known in the art.

Component (c) of the present invention is 0.1 to 5 mole percent, preferably 0.5 to 2 mole percent of a fluorescence quenching compound. Using more than 5 mole percent of the fluorescence quenching compound hinders the crystallization of the polyester and results in inferior physical properties. The fluorescence quenching compound is a copolymerized aromatic ketone which is copolymerized in the poly(ethylene 2,6-naphthalene dicarboxylate) backbone. The copolymerized aromatic ketone contains an aromatic ring selected from benzene, naphthalene and biphenyl.

At least two polymerizable groups are attached to the aromatic ring. Preferably, two polymerizable groups are attached to the aromatic ring. The polymerizable groups are carboxylic esters and/or aliphatic hydroxyl groups. The carboxylic ester has the formula:

wherein $R_3$ is independently a $C_1$ to $C_6$ alkyl or phenyl group, preferably methyl. The aliphatic hydroxyl group has the formula:

wherein n is an integer from 1 to 6, preferably n is 2. Preferred aromatic ring compounds containing polymerizable groups are terephthalic acid, isophthalic acid, and 2,6-naphthalenedicarboxylic acid. The most preferred is 2,6-naphthalenedicarboxylic acid.

In addition to the copolymerizable groups, the aromatic ring contains at least one acyl group which has the structure

wherein $R_4$ is an alkyl group having 1 to 10 carbon atoms, a phenyl group or a naphthyl group having 6 to 16 carbon atoms. The alkyl, phenyl and naphthyl groups of $R_4$ may contain any substituent thereon as long as such substituents do not deleteriously effect the fluorescence quenching of the copolymerized aromatic ketone. Examples of acyl groups include acetyl, benzoyl, 1- or 2-naphthoyl, and propionyl. Preferred acyl groups are benzoyl and 1- or 2-naphthoyl. The most preferred acyl group is the benzoyl group ($C_6H_5CO-$).

The acyl groups can be attached to any of the unsubstituted positions on the aromatic rings. Preferred copolymerizable aromatic ketones include dimethyl benzoylterephthalate (or benzoyl terephthalic acid), dimethyl 1-benzoyl 2,6-naphthalenedicarboxylate, dimethyl 3-benzoyl 2,6-naphthalenedicarboxylate, dimethyl 4-benzoyl 2,6-naphthalenedicarboxylate, dimethyl 1-(2-naphthoyl) 2,6-naphthalenedicarboxylate, and dimethyl benzoylisophthalate. The most preferred copolymerizable aromatic ketones are dimethyl benzoylterephthalate and dimethyl benzoyl 2,6-naphthalenedicarboxylate.

Many other ingredients can be added to the compositions of the present invention to enhance the performance properties of the polyester. For example, surface lubricants, denesting agents, stabilizers, antioxidants, ultraviolet light absorbing agents, mold release agents, metal deactivators, colorants such as black iron oxide and carbon black, nucleating agents, phosphate stabilizers, zeolites, fillers, and the like, can be included herein. All of these additives and the use thereof are well known in the art. Any of these compounds can be used so long as they do not hinder the present invention from accomplishing its objects.

The poly(ethylene 2,6-naphthalene dicarboxylate) polymer with the fluorescence quenching compound is prepared by conventional polycondensation procedures well known in the art which generally include a combination of melt phase and solid state polymerization. Melt phase describes the molten state of PEN during the initial polymerization process. The initial polymerization process includes direct condensation of the naphthalene-2,6-dicarboxylic acid with ethylene glycol or by ester interchange using naphthalene-2,6-dicarboxylic ester. For example, dimethyl-2,6-naphthalenedicarboxylate is ester interchanged with ethylene glycol at elevated temperatures in the presence of the copolymerizable aromatic ketone and a catalyst. The melt phase is concluded by extruding the PEN polymer into strands and pelletizing. Optionally, the copolymerizable aromatic ketone can be melt blended with the poly(ethylene 2,6-naphthalene dicarboxylate).

The poly(ethylene-2,6-naphthalene dicarboxylate) with the fluorescence quenching compound may optionally be solid state polymerized. Solid state polymerization involves heating the PEN pellets to a temperature in excess of 200° C., but well below the crystalline melt point, either in the presence of an inert gas stream or in a vacuum to remove a diol. Several hours are generally required in the solid state polymerized unit to build the molecular weight.

Typical catalysts which may be used include titanium alkoxides, dibutyl tin dilaurate, combinations of zinc, manganese, or magnesium acetates or benzoates with antimony oxide or antimony triacetate.

The poly(ethylene-2,6-naphthalene dicarboxylate) polymers of the present invention have a melting point (Tm) of about 263° C.±10° C. and a glass transition temperature (Tg) of about 125° C.±5° C. The inherent viscosity of the polyester should be 0.3 to 1.5 dL/g. However, inherent viscosities of from 0.5 to 0.9 are preferred, as measured at 25° C. using 0.50 grams of polymer per 100 ml of a solvent consisting of 60% by weight phenol and 40% by weight tetrachloroethane.

The poly(ethylene-2,6-naphthalene dicarboxylate) compositions serve as excellent starting materials for the production of moldings of all types. Specific applications include food packaging such as bottles, trays, lids and films, medical parts, appliance parts, automotive parts, tool housings, recreational and utility parts. The molding compositions of the present invention are especially useful in applications that require transparent molded parts. Additionally, the polyesters can be used to prepare extruded sheets for thermoforming applications. The polyesters are readily extruded into films or processed into monolayer or multilayer food and beverage containers. Potential methods for producing containers include: (1) injection stretch blow molding using either one or two stage technology, (2) injection blow molding, (3) extrusion blow molding, (4) pipe extrusion, and (5) co injection or coextrusion where the polyesters can serve as either the structural layer or barrier layer depending upon end use requirements. Fibers, melt blown webs, extruded sheets, vacuum drawn trays/parts, Injection molded parts, and extrusion coated wires may also be made from these polyesters.

The materials and testing procedures used for the results shown herein are as follows:

Fluorescence Intensity was determined using a Perkin Elmer LS5B Luminescence Spectrometer which measured relative fluorescence intensity at peak maxima.

The composition of the polyesters was determined using H NMR spectroscopy (JEOL 270 Mhz). Solutions (2.5% weight/volume) in 70/30 $CDCl_3CF_3COOD$ were scanned 256 times. A delay of 10 seconds was used with a pulse width of 3.4 microseconds (5.0 microseconds, 90°).

Glass transition temperature (Tg), melting temperature (Tm) and crystallization half time ($t_{\frac{1}{2}}$) were determined by differential scanning calorimetry (DSC) using a Perkin Elmer DSC II instrument. The Tg and Tm were determined using a 20° C./minute scan rate after the samples had been heated above the Tm and quenched below the Tg. The $t_{\frac{1}{2}}$ was determined by the following method: The sample was heated to 300° C. under a nitrogen atmosphere and held for two minutes. The sample was removed from the DSC and immediately cooled to −20° C. The DSC was cooled to 50° C. and the sample was returned to the DSC. The temperature of the DSC was increased at a rate of 320° C./minute to a test temperature of 190° C., 210° C. or 230° C. Samples were isothermally crystallized at each of the test temperatures. The crystallization half time ($t_{\frac{1}{2}}$) is the time required to reach the peak on the crystallization exotherm.

Inherent viscosity (I.V.) was measured at 25° C. using 0.50 grams of polymer per 100 ml of a solvent consisting of 60% by weight phenol and 40% by weight tetrachloroethane.

Sample preparation for determining fluorescence intensity involved grinding the polyester samples to 3–4 mm. The samples were micropulverized in an analytical grinding mill and passed through a 120 mesh screen. The powders were dried for 24 hours at 140° C. Approximately 0.5 grams of the powder was packed into a sample holder and measurements were taken by reflectance. The excitation wavelength was 350 nm and the emission maxima was 428–432 nm for all of the samples. The values are reported as normalized to PEN (fluorescence intensity 100). The fluorescence intensity of PEN was repeated 10 times with a standard deviation of 5.0. Two measurements were taken of all other samples and the averages are reported in Table I.

The present invention will be further illustrated by a consideration of the following examples, which are intended to be exemplary of the invention. All parts and percentages in the examples are on a weight basis unless otherwise stated.

EXAMPLE 1

Poly(ethylene 2,6-naphthalene dicarboxylate) was prepared by the following procedure.

Dimethyl 2,6-naphthalene dicarboxylate (0.5 moles, 122 grams), ethylene glycol (1.0 moles, 62 grams), and catalyst metals were placed in a 500 mL polymerization reactor under a nitrogen atmosphere. The mixture was heated with stirring at 200° C. for 2 hours. The temperature was increased to 220° C. and maintained for 1 hour. The temperature was increased to 290° C. which took approximately 20 minutes. When the temperature reached 290° C., the nitrogen flow was stopped and vacuum was applied. The polymer was stirred under vacuum (0.1–0.3 mm Hg) for 50 minutes. The polymer was cooled and ground. The fluorescence intensity and I.V. of the polymer are summarized in Table I, and Tg, Tm and $t_{\frac{1}{2}}$ are listed in Table II.

EXAMPLE 2

Poly(ethylene 2,6-naphthalene dicarboxylate) with 0.5 mole percent copolymerized dimethyl 1-benzoyl-2,6-naphthalene dicarboxylate was prepared by the following procedure.

Dimethyl 2,6-naphthalene dicarboxylate (0.124 moles, 30.35 grams), dimethyl 1-benzoyl-2,6-naphthalene dicarboxylate (0.00063 moles, 0.22 grams), ethylene glycol (0.25 moles, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 3

Poly(ethylene 2,6-naphthalene dicarboxylate) with 1.0 mole percent copolymerized dimethyl 1-benzoyl-2,6-naphthalene dicarboxylate was prepared by the following procedure.

Dimethyl 2,6 naphthalene dicarboxylate (0.124 moles, 30.35 grams), dimethyl-1-benzoyl-2,6-naphthalene dicarboxylate (0.00125 moles, 0.44 grams), ethylene glycol (0.25 moles, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 4

Poly(ethylene 2,6-naphthalene dicarboxylate) with 2.0 mole percent copolymerized dimethyl 1-benzoyl-2,6-naphthalene dicarboxylate was prepared by the following procedure.

Dimethyl 2,6-naphthalene dicarboxylate (0.123 moles, 29.98 grams), dimethyl 1-benzoyl-2,6-naphthalene dicarboxylate (0.0025 moles, 0.87 grams), ethylene glycol (0.25 moles, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and Tg, Tm are listed in Table II.

EXAMPLE 5

Poly(ethylene 2,6-naphthalene dicarboxylate) with 5.0 mole percent copolymerized dimethyl 1-benzoyl-2,6-naphthalene dicarboxylate was prepared by the following procedure.

Dimethyl 2,6-naphthalene dicarboxylate (0.119 moles, 28.98 grams), dimethyl 1-benzoyl-2,6-naphthalene dicarboxylate (0.00625 moles, 2.18 grams), ethylene glycol (0.25 moles, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and Tg are listed in Table II.

EXAMPLE 6

Poly(ethylene 2,6-naphthalene dicarboxylate) with 1.2 mole percent copolymerized dimethyl benzoyl-terephthalate was prepared by the following procedure.

Dimethyl 2,6-naphthalene dicarboxylate (0.495 moles, 120.78 grams), dimethyl benzoylterephthalate (0.0058 moles, 1.74 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 7

Poly(ethylene 2,6-naphthalene dicarboxylate) with 2.0 mole percent copolymerized dimethyl benzoyl-terephthalate was prepared by the following procedure.

Dimethyl 2,6-naphthalene dicarboxylate (0.49 moles, 119.56 grams), dimethyl benzoylterephthalate (0.010 moles, 2.98 grams), ethylene glycol (1.0 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 8

Poly(ethylene 2,6-naphthalene dicarboxylate) with 3.5 mole percent copolymerized dimethyl benzoyl-terephthalate was prepared by the following procedure.

Dimethyl 2,6-naphthalene dicarboxylate (0.483 moles, 117.7 grams), dimethyl benzoylterephthalate (0.018 moles, 5.22 grams), ethylene glycol (1.00 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 9

Poly(ethylene 2,6-naphthalene dicarboxylate) with 5.0 mole percent copolymerized dimethyl benzoyl-terephthalate was prepared by the following procedure.

Dimethyl 2,6-naphthalene dicarboxylate (0.475 moles, 115.90 grams), dimethyl benzoylterephthalate (0.025 moles, 7.45 grams), ethylene glycol (1.00 mole, 62.0 grams), and catalyst metals were placed in a 500 mL polymerization reactor under a nitrogen atmosphere. The polymer was prepared according to the procedure as set forth in Example 1. The fluorescence intensity and I.V. of the polymer are summarized in Table I, and $t_{\frac{1}{2}}$ are listed in Table II.

EXAMPLE 10

Poly(ethylene 2,6-naphthalene dicarboxylate) with 0.5 mole percent copolymerized dimethyl 1-(2-naphthoyl)-2,6-naphthalene dicarboxylate was prepared by the following procedure.

Dimethyl-2,6-naphthalene dicarboxylate (0.124 moles, 30.35 grams), dimethyl 1-(2-naphthoyl)-2,6-naphthalene dicarboxylate (0.00063 moles, 0.25 grams), ethylene glycol (0.25 mole, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and Tg and Tm are listed in Table II.

EXAMPLE 11

Poly(ethylene 2,6-naphthalene dicarboxylate) with 1.0 mole percent copolymerized dimethyl 1-(2-naphthoyl)-2,6-naphthalene dicarboxylate was prepared by the following procedure.

Dimethyl-2,6-naphthalene dicarboxylate (0.124 moles, 30.20 grams), dimethyl 1-(2-naphthoyl)-2,6-naphthalene dicarboxylate (0.00125 moles, 0.50 grams), ethylene glycol (0.25 mole, 15.5 grams), and catalyst metals were placed in a 100 mL polymerization reactor under a nitrogen atmosphere. The polymer was prepared according to the procedure as set forth in Example 1. The fluorescence intensity and I.V. of the polymer are summarized in Table I, and Tg and Tm are listed in Table II.

TABLE I

| EXAMPLE | AROMATIC KETONE (mole %) | I.V. (dL/g) | FLUORESCENCE INTENSITY (at 430 nm) |
|---|---|---|---|
| 1 | PEN control | 0.42 | 100 |
| 2 | PEN + 0.5% 1-benzoyl-DMN[1] | 0.48 | 47 |
| 3 | PEN + 1.0% 1-benzoyl-DMN[1] | 0.47 | 33 |
| 4 | PEN + 2.0% 1-benzoyl-DMN[1] | 0.43 | 26 |
| 5 | PEN + 5.0% 1-benzoyl-DMN[1] | 0.45 | 13 |
| 6 | PEN + 1.2% benzoyl-DMT[2] | 0.38 | 79 |
| 7 | PEN + 2.0% benzoyl-DMT[2] | 0.42 | 62 |
| 8 | PEN + 3.5% benzoyl-DMT[2] | 0.44 | 62 |
| 9 | PEN + 5.0% | 0.39 | 43 |

TABLE I-continued

| EX-AMPLE | AROMATIC KETONE (mole %) | I.V. (dL/g) | FLUORESCENCE INTENSITY (at 430 nm) |
|---|---|---|---|
| 10 | benzoyl-DMT[2] PEN + 0.5% 1-(2-naphthoyl)-N[3] | 0.35 | 40 |
| 11 | PEN + 1.0% 1-(2-naphthoyl)-N[3] | 0.39 | 28 |

[1]dimethyl 1-benzoyl-2,6-naphthalene dicarboxylate
[2]dimethyl benzoylterephthalate
[3]1-(2-naphthoyl)-2,6-naphthalene dicarboxylate The results in Table I clearly indicate that the poly(ethylene-2,6-naphthalene dicarboxylate) compositions containing a critical range of an aromatic ketone as a fluorescence quencher, which is copolymerized in the PEN backbone, exhibit significantly less fluorescence quencher. In addition, the data in Table I also indicates that the use of the fluorescence quencher in a critical amount does not deleteriously effect the inherent viscosity of the polyester.

TABLE II

| EX-AMPLE | AROMATIC KETONE (mole %) | Tg (°C.) | Tm (°C.) | t₁ (min.) 190° C. | 210° C. | 230° C. |
|---|---|---|---|---|---|---|
| 1 | PEN control | 123 | 268 | 2.5 | 1.5 | 2.5 |
| 2 | PEN + 0.5% 1-benzoyl-DMN[1] | — | — | 5.7 | 3.7 | 5.8 |
| 3 | PEN + 1.0% 1-benzoyl-DMN[1] | — | — | 6.0 | 4.2 | 7.9 |
| 4 | PEN + 2.0% 1-benzoyl-DMN[1] | 123 | 262 | — | — | — |
| 5 | PEN + 5.0% 1-benzoyl-DMN[1] | 126 | — | — | — | — |
| 6 | PEN + 1.2% benzoyl-DMT[2] | — | — | 3.0 | 1.9 | 3.1 |
| 7 | PEN + 2.0% benzoyl-DMT[2] | — | — | 3.9 | 2.6 | 4.9 |
| 8 | PEN + 3.5% benzoyl-DMT[2] | — | — | 3.8 | 2.8 | 6.3 |
| 9 | PEN + 5.0% benzoyl-DMT[2] | — | — | 4.0 | 3.3 | 8.8 |
| 10 | PEN + 0.5% 1-(2-naphthoyl)-N[3] | 122 | 266 | — | — | — |
| 11 | PEN + 1.0% 1-(2-naphthoyl)-N[3] | 124 | 266 | — | — | — |

[1]dimethyl 1-benzoyl-2,6-naphthalene dicarboxylate
[2]dimethyl benzoylterephthalate
[3]1-(2-naphthoyl)-2,6-naphthalene dicarboxylate The results in Table II establish the critical range for the aromatic ketones as fluorescence quenchers which are copolymerized in the poly(ethylene-2,6-naphthalene dicarboxylate) backbone. The data indicates that 0.1 to 5 mole percent of the aromatic ketones reduce fluorescence without deleteriously effecting the physical properties of the polyester. In contrast, greater than 5 mole percent of the aromatic ketones in the compositions slows down the crystallization rate to an unacceptable level.

EXAMPLE 12

Preparation of industrial scale poly(ethylene 2,6-naphthalene dicarboxylate) with 1.0 mole percent copolymerized dimethyl 1-benzoyl-2,6-naphthalene dicarboxylate was prepared by the following procedure.

Dimethyl 2,6-naphthalene dicarboxylate (28.1 moles, 6.86 kilograms), dimethyl 1-benzoyl-2,6-naphthalene dicarboxylate (0.28 moles, 96.6 grams), ethylene glycol (56.3 moles, 3.49 kilograms), and catalyst metals were placed in a 10 gallon steel polymerization reactor equipped with a twin blade helical agitator under a nitrogen atmosphere. The mixture was heated with stirring at 200° C. for 2 hours. The temperature was increased to 220° C. and maintained for 2 hours. The temperature was increased to 285° C. When the temperature reached 285° C., the nitrogen flow was stopped and vacuum was applied. The polymer was stirred under vacuum (0.5 mm Hg) for 50 minutes. The polymer was extruded into a water bath and pelletized. The amorphous polymer was transferred to a vacuum oven and dried for three hours at 80° C. Crystallization was accomplished in a tumbler crystallizer for three hours at 180° C. The I.V. of the polymer at this stage was 0.59 dL/g.

To increase the molecular weight of the polymer, solid state polymerization was utilized. The crystalline polymer was charged to a stationary bed solid state unit equipped with nitrogen flow. The polymer was heated to 230° C. The temperature was maintained for 24 hours in the presence of a nitrogen purge. The I.V. of the polymer at this stage was 0.71 dL/g. The fluorescence intensity of the polymer was 50 as compared to 135 for similarly prepared PEN containing no fluorescence quencher.

EXAMPLE 13

A two stage stretch blow molding process was utilized to make 2-liter bottles. Preforms were made on a Cincinnati Milacron injection molding machine at a molding temperature of 310° C. The preforms were stored for 24 hours before the bottle blowing step. Bottles were blown by reheating preforms using a quartz lamp by stretch blow molding or reheat blow molding. The preforms were heated slightly above the Tg of the polymer and pressurized to blow them into bottle shaped molds.

Visual inspection indicated that bottles prepared from PEN without a fluorescence quencher exhibited more bluish fluorescence than bottles prepared using PEN with 1.0 mole percent copolymerized dimethyl 1-benzoyl-2,6-naphthalene dicarboxylate.

EXAMPLE 14

Dimethyl 1-benzoyl-2,6-naphthalene dicarboxylate was prepared by the following procedure.

2,6-dimethyl naphthalene (100 grams, 0.64 moles), aluminum chloride (89.3 grams, 0.67 moles), carbon disulfide (600 mL), and methylene chloride (200 mL) were introduced into a 3-neck 2L flask fitted with a mechanical stirrer and cooled to 0°-5° C. Benzoyl chloride (94.2 grams, 0.67 moles) was added dropwise over a period of about 1 hour. The temperature was kept below 10° C. during this addition and throughout the reaction. The reaction mixture was stirred for 6 hours and then decomposed by pouring into ice/HCl. The organic layer was washed 5 times with water and then dried for 12 hours over sodium sulfate. The organic layer was concentrated to a viscous oil and treated with methanol, precipitating 1-benzoyl-2,6-dimethyl-naphthalene as an off white solid. The 1-benzoyl-2,6-dimethylnaphthalene was collected and dried (105 grams, 63%). The 1 benzoyl 2,6-dimethylnaphthalene was determined to be pure by gas chromatography with a melting point of 81°-82° C. (literature mp 84° C.). A molecular weight of 260 was confirmed by Field Desorption Mass Spectroscopy (FDMS).

The 1-benzoyl-2,6-dimethylnaphthalene was oxidized to 1-benzoyl-2,6-naphthalenedicarboxylic acid by the following procedure.

The 1-benzoyl-2,6-dimethylnaphthalene (60 grams, 0.23 moles), sodium dichromate (185 grams, 0.621 moles), and 500 mL water were added to a 1 liter high pressure autoclave. The high pressure oxidation was carried out for 6 hours at 250° C. with stirring. Chromium oxide was filtered off. Filtrate acidification with HCl resulting in precipitation of a light yellow material (67 g, 90%) which was used on the next step without further purification. The 1-benzoyl-2,6-naphthalenedicarboxylic acid had a melting point over 315° C. and FDMS confirmed molecular weight of 320.

The 1-benzoyl-2,6-naphthalenedicarboxylic acid was converted to its dimethyl ester by the following procedure.

The 1-benzoyl-2,6-naphthalenedicarboxylic acid (100 grams, 0313 moles) and methanol (600 mL) were placed in a 1 liter high pressure autoclave fitted with a magnetic stirrer. High pressure esterification was carried out for 2 hours at 250° C. with stirring. The reaction mixture was concentrated to dryness. A light brown solid was the result. Recrystallization from methanol followed with treatment with activated carbon in acetone which was repeated three times afforded (upon concentration) 75 grams (69%) of almost white dimethyl 1-benzoyl-2,6-naphthalene dicarboxylate. The dimethyl 1-benzoyl-2,6-naphthalene dicarboxylate was gas chromatography pure with a melting point of 135°-137° C. FDMS confirmed a molecular weight of 348 and a H NMR spectrum consistent with the stated structure.

Many variations will suggest themselves to those skilled in this art in light of the above detailed description. All such obvious modifications are within the full intended scope of the appended claims.

What is claimed is:

1. A poly(ethylene 2,6-naphthalene dicarboxylate) composition with reduced fluorescence comprising repeat units from:
   (a) a dicarboxylic acid component which comprises at least 85 mole percent of a dicarboxylic acid selected from the group consisting of naphthalene-2,6-dicarboxylic acid, and naphthalene-2,6-dicarboxylate ester;
   (b) a diol component which comprises at least 85 mole percent of ethylene glycol; and
   (c) 0.1 to 5 mole percent, based on 100 mole percent dicarboxylic acid and 100 mole percent diol, of a copolymerizable aromatic ketone which has at least one acyl group directly attached to the aromatic ring.

2. A poly(ethylene 2,6-naphthalene dicarboxylate) composition with reduced fluorescence comprising repeat units from:
   (a) a dicarboxylic acid component consisting essentially of a dicarboxylic acid selected from the group consisting of naphthalene-2,6-dicarboxylic acid, and naphthalene-2,6-dicarboxylate ester;
   (b) a diol component consisting essentially of ethylene glycol; and
   (c) 0.1 to 5 mole percent, based on 100 mole percent dicarboxylic acid and 100 mole percent diol, of a copolymerizable aromatic ketone which has at least one acyl group directly attached to the aromatic ring.

3. A poly(ethylene 2,6-naphthalene dicarboxylate) composition with reduced fluorescence comprising repeat units from:
   (a) a dicarboxylic acid component which comprises at least 85 mole percent of a dicarboxylic acid selected from the group consisting of naphthalene-2,6-dicarboxylic acid, and naphthalene-2,6-dicarboxylate ester;
   (b) a diol component which comprises at least 85 mole percent of ethylene glycol; and
   (c) 0.3 to 2.5 mole percent, based on 100 mole percent dicarboxylic acid and 100 mole percent diol, of a copolymerizable aromatic ketone which has at least one acyl group directly attached to the aromatic ring.

4. The composition of claim 1 wherein the copolymerized aromatic ketone has an aromatic ring selected from the group consisting of benzene, naphthalene and biphenyl.

5. The composition of claim 4 wherein the aromatic ring contains at least two polymerizable groups selected from the group consisting of carboxylic esters, aliphatic hydroxyl groups and combinations thereof.

6. The composition of claim 5 wherein the carboxylic ester has the formula:

wherein $R_3$ is a $C_1$ to $C_6$ alkyl or phenyl group.

7. The composition of claim 6 wherein the carboxylic ester is

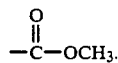

8. The composition of claim 5 wherein the aliphatic hydroxyl group has the formula:

$(CH_2)_n OH$ wherein n is an integer from 1 to 6.

9. The composition of claim 7 wherein the aliphatic hydroxyl group is $(CH_2)_2 OH$.

10. The composition of claim 5 wherein the aromatic ring compound containing polymerizable groups is selected from the group consisting of terephthalic acid, isophthalic acid, 2,6-naphthalenedicarboxylic acid and the ester derivatives thereof.

11. The composition of claim 10 wherein the aromatic ring compound containing polymerizable groups is 2,6-naphthalenedicarboxylic acid.

12. The composition of claim 4 wherein the aromatic ring contains at least one acyl group of the formula

wherein $R_4$ is selected from the group consisting of an alkyl group having 1 to 10 carbon atoms, a phenyl group and a naphthyl group having 6 to 16 carbon atoms.

13. The composition of claim 12 wherein the acyl group is selected from the group consisting of acetyl, benzoyl, 1- or 2-naphthoyl, and propionyl.

14. The composition of claim 13 wherein the acyl group is $C_6H_5CO-$.

15. The composition of claim 1 wherein the copolymerizable aromatic ketone is selected from the group consisting of dimethyl benzoylterephthalate, dimethyl 1-benzoyl-2,6-naphthalenedicarboxylate, dimethyl 3-benzoyl-2,6-naphthalenedicarboxylate, dimethyl 4-benzoyl-2,6-naphthalenedicarboxylate, dimethyl 1-(2-naphthoyl) 2,6-naphthalenedicarboxylate, dimethyl benzoylisophthalate and combinations thereof.

16. The composition of claim 15 wherein the copolymerizable aromatic ketone is dimethyl benzoylterephthalate.

17. The composition of claim 15 wherein the copolymerizable aromatic ketone is dimethyl 1-benzoyl-2,6-naphthalene dicarboxylate.

18. The composition of claim 15 wherein the copolymerizable aromatic ketone is 1-(2-naphthoyl)-2,6-naphthalene dicarboxylate.

* * * * *